United States Patent [19]
Lee

[11] Patent Number: 5,694,487
[45] Date of Patent: Dec. 2, 1997

[54] METHOD AND APPARATUS FOR DETERMINING FEATURE POINTS

[75] Inventor: Min-Sub Lee, Seoul, Rep. of Korea

[73] Assignee: Daewoo Electronics Co., Ltd., Seoul, Rep. of Korea

[21] Appl. No.: 434,824

[22] Filed: May 4, 1995

[30] Foreign Application Priority Data

Mar. 20, 1995 [KR] Rep. of Korea .................. 95-5857

[51] Int. Cl.⁶ ........................................ G06K 9/46
[52] U.S. Cl. .................. 382/201; 382/199; 382/236; 348/413; 348/416
[58] Field of Search ......................... 382/199, 205, 382/236, 201; 348/402, 407, 413, 416

[56] References Cited

U.S. PATENT DOCUMENTS

| | | | |
|---|---|---|---|
| 4,817,174 | 3/1989 | Nakatani | 382/199 |
| 4,910,786 | 3/1990 | Eichel | 382/199 |
| 5,144,688 | 9/1992 | Bovir et al. | 382/232 |

*Primary Examiner*—Jose L. Couso
*Assistant Examiner*—Anh Hong Do
*Attorney, Agent, or Firm*—Anderson Kill & Olick, P.C.

[57] ABSTRACT

A method for determining feature points comprises a step for (a) providing directional gradients and a gradient magnitude for each pixel in the video frame, (b) normalizing the directional gradients by dividing the directional gradients with the gradient magnitude, (c) generating a first edge map having the gradient magnitude for each pixel, (d) generating a second edge map having the normalized direction gradients for each pixel, (e) dividing the first edge map into a plurality of blocks of an identical size, (f) providing, for each of the pixels included in each of the blocks, normalized directional gradients for a set of a predetermined number of pixels from the second edge map, (g) obtaining a variance for each of the pixels included in each of the blocks based on the provided normalized directional gradients, (h) determining a feature point for each of the blocks based on the gradient magnitude and variance corresponding to each of the pixels therein.

4 Claims, 3 Drawing Sheets

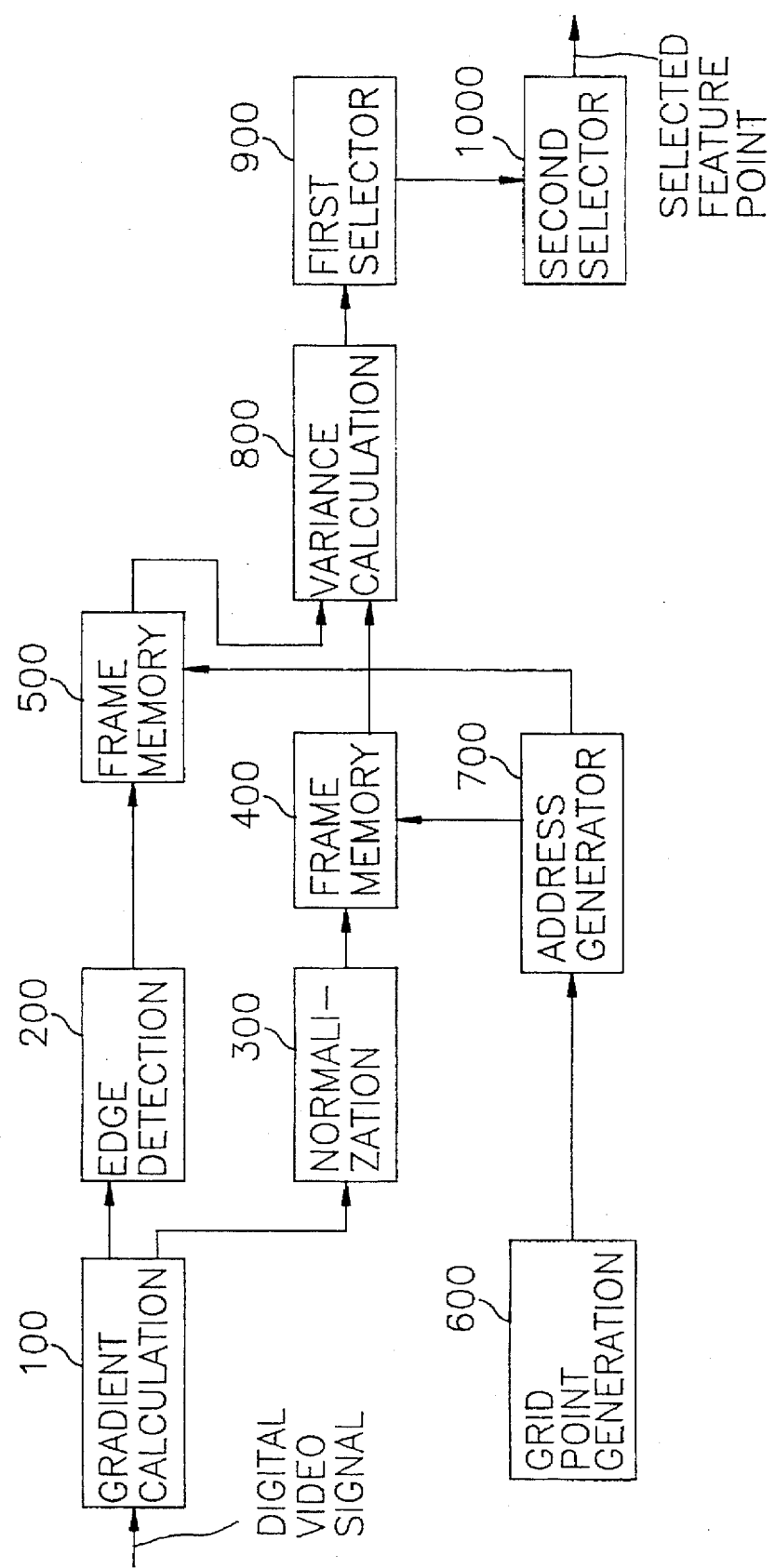

SOBEL$^{(x)}$ $$\begin{bmatrix} -1 & 0 & 1 \\ -2 & \boxed{0} & 2 \\ -1 & 0 & 1 \end{bmatrix}$$

SOBEL$^{(y)}$ $$\begin{bmatrix} -1 & -2 & -1 \\ 0 & \boxed{0} & 0 \\ 1 & 2 & 1 \end{bmatrix}$$

METHOD AND APPARATUS FOR DETERMINING FEATURE POINTS

FIELD OF THE INVENTION

The present invention relates to a method and an apparatus for determining feature points; and, more particularly, to a method and an apparatus for determining feature points based on pixel intensity gradients and variances thereof.

DESCRIPTION OF THE PRIOR ART

As is well known, transmission of digitized video signals can attain video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data therethrough, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse coded modulation) which is a process of estimating the movement of an object between a current frame and its previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/ Transform Coding", *IEEE Transactions on Communications*, COM-33, No. 12 (December 1985); and in Ninomiya and Ohtsuka, "A Motion-Compensated Interframe Coding Scheme for Television Pictures", *IEEE Transactions on Communications*, COM-30, No. 1 (January 1982).

In the motion compensated DPCM, current frame data is predicted from the corresponding previous frame data based on an estimation of the motion between the current and the previous frames. Such estimated motion may be described in terms of two dimensional motion vectors representing the displacement of pixels between the previous and the current frames.

There have been two basic approaches to estimate the displacement of pixels of an object: one is a block-by-block estimation and the other is a pixel-by-pixel approach.

In the block-by-block motion estimation, a block in a current frame is compared with blocks in its previous frame until a best match is determined. From this, an interframe displacement vector (representing how much the block of pixels has moved between frames) for the whole block can be estimated for the current frame being transmitted. However, in the block-by-block motion estimation, poor estimates may result if all pixels in the block do not move in a same way, to thereby decrease the overall picture quality.

Using a pixel-by-pixel approach, on the other hand, a displacement is determined for each and every pixel. This technique allows a more exact estimation of the pixel value and has the ability to easily handle scale changes (e.g., zooming, movement perpendicular to the image plane). However, in the pixel-by-pixel approach, since a motion vector is determined for each and every pixel, it is virtually impossible to transmit all of the motion vectors to a receiver.

One of the techniques introduced to ameliorate the problem of dealing with the surplus or superfluous transmission data resulting from the pixel-by-pixel approach is a feature point-based motion estimation method. In the feature point-based motion estimation technique, a set of selected pixels, i.e., feature points are determined at an encoder in a transmitting end and a decoder in a receiving end in an identical manner and motion vectors for the feature points are transmitted to the receiver without bearing position data for those feature points, wherein the feature points are defined as pixels of a previous frame or a current frame capable of representing motions of objects in a video signal so that motion vectors for all the pixels of the current frame can be recovered or approximated from those of the feature points in the receiver. In an encoder which adopts the motion estimation based on feature points, disclosed in a commonly owned copending application, U.S. Ser. No. 08/367,520, entitled "Method and Apparatus for Encoding a Video Signal Using Pixel-by-Pixel Motion Estimation", a number of feature points are first selected from all of the pixels contained in the previous frame. Then, motion vectors for the selected feature points are determined, wherein each of the motion vectors represents a spatial displacement between one feature point in the previous frame and a corresponding matching point, i.e., a most similar pixel, in the current frame. Specifically, the matching point for each of the feature points is searched in a search region within the current frame, wherein the search region is defined as a region of a predetermined area which encompasses the position of the corresponding feature point. In the feature point-based motion estimation technique, since the current frame is predicted from the previous frame based on those motion vectors for a set of feature points, it is important to select the feature points capable of correctly representing the movement of the object.

Typically, in an encoder and a decoder which adopt the motion estimation based on feature points, a number of feature points are selected by using a grid technique or a combination of an edge detection technique and the grid technique.

In the grid technique employing various types of grid, e.g., a rectangular or hexagonal grid, the nodes, i.e., grid points of the grid, are determined as the feature points, and in the combination of the edge detection technique and the grid technique, intersection points of the grid and the edge of the object are selected as the feature points. However, the grid points or the intersection points do not always correctly represent the movement of the object, resulting in a poor motion estimation of the object.

SUMMARY OF THE INVENTION

It is, therefore, a primary object of the present invention to provide an improved method and apparatus for determining feature points through the use of pixel intensity gradients and variances of those pixels on object boundaries.

In accordance with the invention, there is provided an apparatus, for use in a video signal processor which adopts a feature point based motion compensation technique, for determining feature points, said feature points being pixels capable of representing motions of objects in a video frame, comprising: means for providing directional gradients and a gradient magnitude for each pixel in the video frame; means for normalizing the directional gradients by dividing the directional gradients with the gradient magnitude; means for generating a first edge map having the gradient magnitude for each pixel; means for generating a second edge map having the normalized directional gradients for each pixel; means for dividing the first edge map into a plurality of blocks of an identical size, wherein the blocks do not overlap each other and each of the blocks includes a gradient magnitude corresponding to each of the pixels therein; means for providing, for each of the pixels included in each of the blocks, normalized directional gradients for a set of a predetermined number of pixels from the second edge map, wherein said set of pixels includes said each of the pixels; means for obtaining a variance for each of the pixels included in each of the blocks based on the provided normalized directional gradients; and means for determining a feature point for each of the blocks based on the gradient magnitude and variance corresponding to each of the pixels therein.

BRIEF DESCRIPTION OF THE DRAWINGS

The above and other objects and features of the present invention will become apparent from the following description of preferred embodiments given in conjunction with the accompanying drawings, in which:

FIG. 1 depicts a block diagram of the inventive apparatus for determining feature points;

DETAILED DESCRIPTION OF THE PREFERRED EMBODIMENTS

Referring to FIG. 1, there is illustrated an apparatus, for use in an encoder and a decoder which adopt a feature point based motion compensation technique, for determining feature points in accordance with the present invention, wherein the feature points are defined as pixels capable of representing motions of objects in a video signal. A digital video signal of a video frame, e.g., a previous or a current frame, is fed to a gradient calculation block 100.

Figures 2A, 2B, 3:
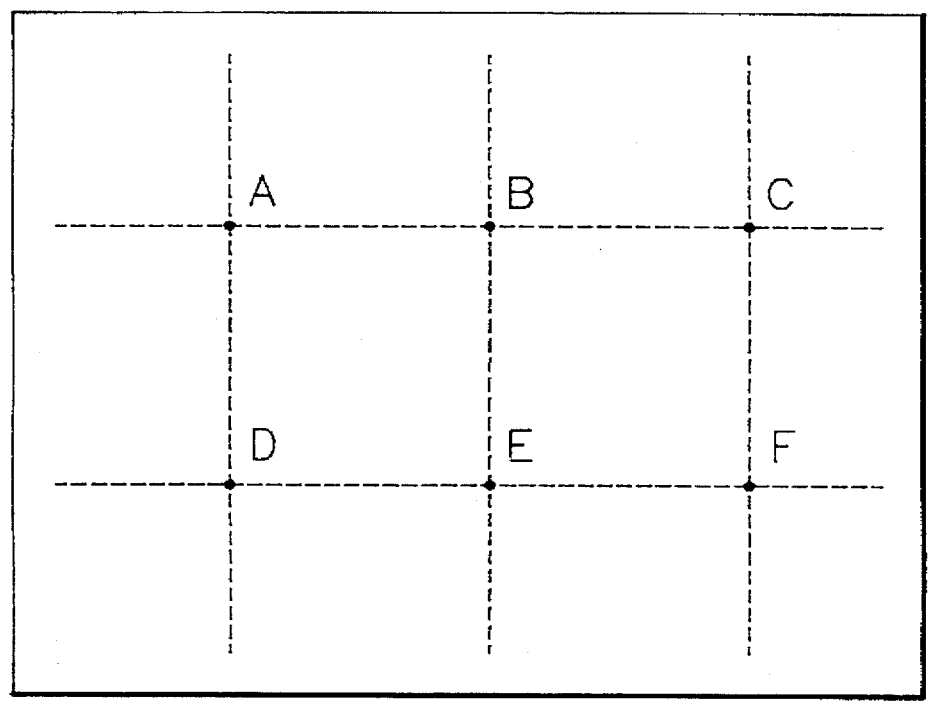
FIGS. 2A and 2B show a horizontal and a vertical sobel operators.
FIG. 3 offers exemplary grid points generated by employing a rectangular grid.

At the gradient calculation block 100, pixel intensity gradients for all of the pixels in the video frame are calculated by using a gradient operator, e.g., a sobel operator. The sobel operator computes horizontal and vertical differences of local sums, and has the desirable property of yielding zeros for uniform regions. In FIGS. 2A and 2B, a horizontal and a vertical sobel operators, sobel$^{(x)}$ and sobel $^{(y)}$, are exemplarily illustrated, each boxed element indicating the location of the origin. The horizontal and the vertical sobel operators measure the gradient of an image I(x, y) in two orthogonal directions. Directional gradients, i.e., horizontal and vertical gradients $G_x(x, y)$ and $G_y(x, y)$ at a pixel location (x, y), are defined as:

$$G_x(x,y) = \frac{1}{4} \sum_{i=-1}^{1} \sum_{j=-1}^{1} I(x+i, y+j) * h^{(x)}(i,j)$$ Eq. (1)

$$G_y(x,y) = \frac{1}{4} \sum_{i=-1}^{1} \sum_{j=-1}^{1} I(x+i, y+j) * h^{(y)}(i,j)$$

wherein $h^{(x)}(i, j)$ and $h^{(y)}(i, j)$ are sobel coefficients at (i, j) locations of the horizontal and vertical sobel operators, respectively.

A gradient magnitude g(x, y) at the pixel location (x, y) is then given by $$g(x,y) = \sqrt{G_x(x,y)^2 + G_y(x,y)^2}$$ Eq. (2)

or $$g(x,y) = |G_x(x,y)| + |G_y(x,y)|$$

The gradient magnitude g(x, y) is applied to an edge detection block 200 for detecting edge points on object boundaries, and the directional gradients $G_x(x, y)$ and $G_y(x, y)$ are applied to a normalization block 300 for the normalization thereof.

The edge detection block 200 detects edge points in the video frame by comparing a gradient magnitude for each pixel in the video frame with a predetermined threshold value TH. That is, the pixel location (x, y) is an edge point if g(x, y) exceeds TH.

Typically, the predetermined threshold value TH may be selected using the cumulative histogram of g(x, y) so that 5 to 10% of pixels with largest gradient magnitudes are determined as edges. The locations of the detected edge points constitute a first edge map E(x, y), which is defined as:

$$E(x,y) = \begin{cases} g(x,y), (x,y) \in \{(x,y); g(x,y) > TH\} \\ 0, \quad \text{otherwise} \end{cases}$$ Eq. (3)

That is, the edge map is formed by allocating gradient magnitudes to their respective edge points and "zeros" to non-edge points. The edge map provides boundary information for tracing the object boundaries in the image, wherein the boundary information includes position data of the pixels in the video frame and gradient magnitudes corresponding to respective pixel positions. The boundary information produced by the edge detection block 200 is fed to a frame memory 500 and stored therein as the first edge map.

At the normalization block 300, the directional gradients $G_x(x, y)$ and $G_y(x, y)$ supplied from the gradient calculation block 100 are normalized as follows:

$$U_x(x,y) = \begin{cases} \dfrac{G_x(x,y)}{\sqrt{G_x(x,y)^2 + G_y(x,y)^2}}, & (x,y) \in \{(x,y); g(x,y) > 0\} \\ 0, & \text{otherwise} \end{cases}$$ Eq. (3)

$$U_y(x,y) = \begin{cases} \dfrac{G_y(x,y)}{\sqrt{G_x(x,y)^2 + G_y(x,y)^2}}, & (x,y) \in \{(x,y); g(x,y) > 0\} \\ 0, & \text{otherwise} \end{cases}$$

wherein $U_x(x, y)$ and $U_y(x, y)$ represent the normalized horizontal and vertical gradients of the respective gradients $G_x(x, y)$ and $G_y(x, y)$ at a pixel location (x, y). The position data of the pixels and the normalized gradients $U_x(x, y)$ and $U_y(x, y)$ corresponding to respective pixel positions are provided to a frame memory 400 and stored therein as a second edge map.

In the meantime, a grid point generation block 600 provides a plurality of grid points to an address generator 700. The grid points are pixel positions, e.g., A to F, located at the nodes of a grid, e.g., a rectangular grid depicted in dotted lines as shown in FIG. 3, wherein each grid point is N pixels apart from its neighboring grid points in the horizontal and vertical directions, N being an even integer. The address generator 700 generates, for each grid point, a see of first address data which represents locations of (N+1)×(N+1), e.g., 9×9, pixels constituting a first processing block, the first processing block having the grid point at the center thereof; and generates (N+1)×(N+1) sets of second address data, each set of the second address data represents locations of (2M+1)×(2M+1), e.g., 11×11, pixels (M being an odd integer) which form a second processing block, the second processing block including each of the (N+1)×(N+1) pixels included the first processing block at the center thereof. The set of first address data and the sets of second address data for each grid point are fed to the frame memories 500 and 400, respectively.

In response to the set of first address data for each grid point from the address generator 700, first edge map data corresponding the first processing block is retrieved from the frame memory 500 and provided to a variance calculation block 800, wherein the first edge map data represents position data of the (N+1)×(N+1) pixels included in the first processing block and gradient magnitudes corresponding to respective pixel positions. In the meantime, in response to each set of the second address data generated from the address generator 700, second edge map data corresponding to each of the (N+1)×(N+1) second processing blocks is retrieved from the frame memory 400 and fed to the variance calculation block 800, wherein the second edge map data represents position data of the (2M+1)×(2M+1) pixels included in the second processing block and normalized directional gradients corresponding to those pixel positions.

At the variance calculation block 800, a variance of the normalized directional gradients included in each of the (N+1)×(N+1) second processing blocks is calculated and set to a variance for a pixel at the center thereof. As is well known, a variance is a measure of deviation of sample values from their mean value, which implies that the greater the variance, the greater the degree of distribution of the gradients, i.e., the more complicated boundary configuration around the center pixel.

A variance Var(x, y) at a position (x, y) may then be defined as:

$$Var(x,y) = \frac{1}{(2M+1)^2} \sum_{i=-M}^{M} \sum_{j=-M}^{M} [(U_x(x+i,y+j) - \overline{U}_x(x,y))^2 + (U_y(x+i,y+j) - \overline{U}_y(x,y))^2] \quad \text{Eq. (5)}$$

wherein $U_x(x+i, y+j)$ and $U_y(x+i, y+j)$ are normalized horizontal and vertical gradients at pixel locations within a second processing block with a pixel location (x, y) at the center thereof.

$\overline{U}_x(x, y)$ and $\overline{U}_y(x, y)$ are average values of the normalized horizontal and vertical gradients included in the second processing block, which may be defined as:

$$\overline{U}_x(x,y) = \frac{1}{(2M+1)^2} \sum_{i=-M}^{M} \sum_{j=-M}^{M} U_x(x+i,y+j) \quad \text{Eq. (6)}$$

$$\overline{U}_y(x,y) = \frac{1}{(2M+1)^2} \sum_{i=-M}^{M} \sum_{j=-M}^{M} U_y(x+i,y+j)$$

Thereafter, the variance calculation block 800 provides third edge map data for each first processing block to a first selector 900, wherein the third edge map data includes pixel position data of the (N+1)×(N+1) pixels within the first processing block and gradient magnitudes and calculated variances Var(x, y) corresponding to respective pixel positions included in the first processing block.

The first selector 900 selects maximum P, e.g., 5, pixels in the order of variance magnitudes beginning from a largest one, wherein P being a predetermined number larger than 1.

Specifically, if the first processing block includes P or more pixels having non-zero valued gradient magnitudes, P pixels are selected therefrom in a descending order of their variances; if less than P pixels having non-zero valued gradient magnitudes exist, all of those pixels are selected; and if all the pixels in the first processing block have zero valued gradient magnitudes, no pixel is selected.

Figure 4:
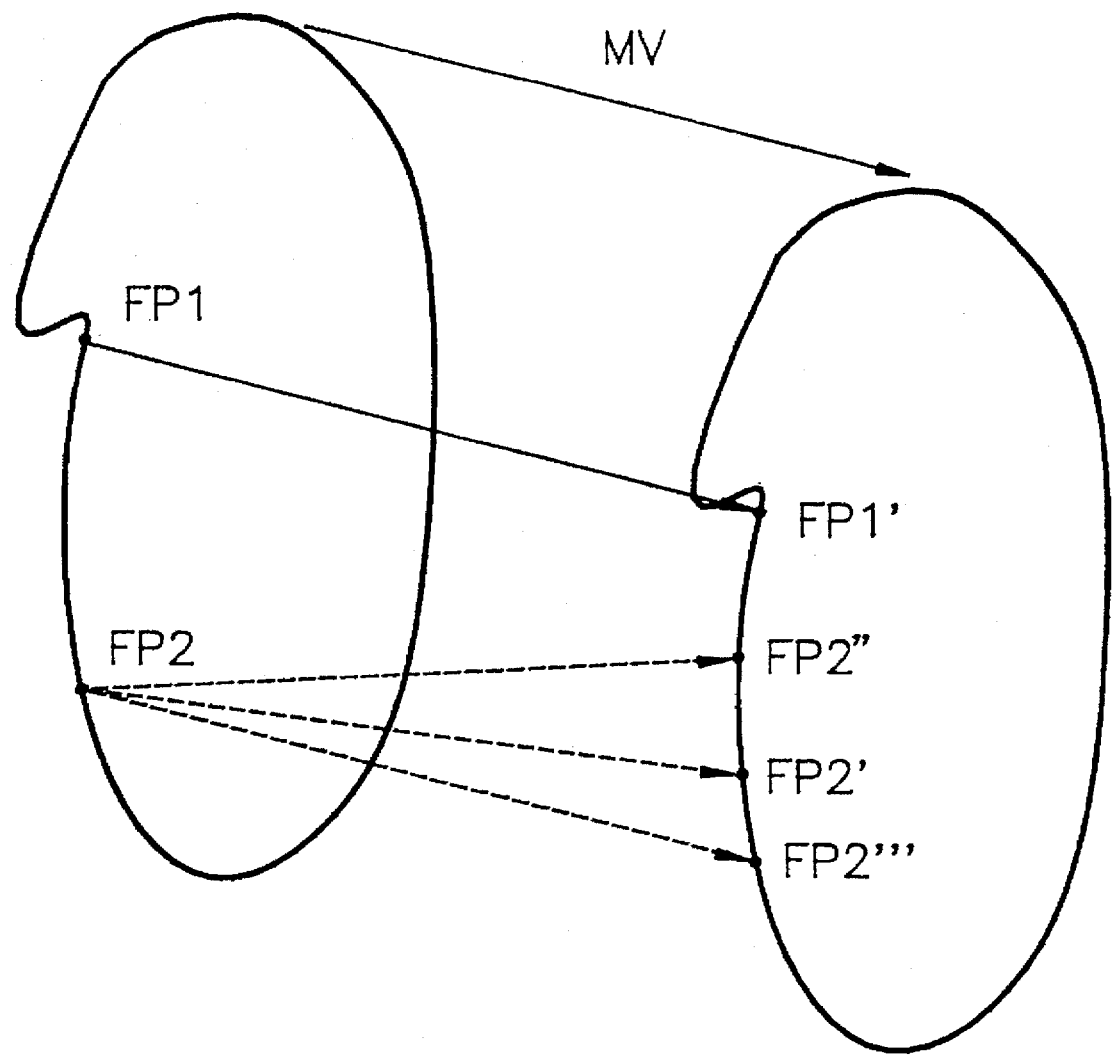
FIG. 4 represents a diagram explaining the feature point determination scheme employed in the present invention.

Referring to FIG. 4, there is illustrated a diagram explaining the feature point determination scheme employed in the present invention. Assuming a displacement of an object between two video frames is MV and two feature points FP1 and FP2 are selected on the boundary of the object. Normally, a motion vector of a feature point is determined by using a block matching algorithm. That is, a motion vector for a search block of, e.g., 5×5 pixels having the feature point at the center thereof is determined by using the conventional block matching algorithm and the motion vector of the search block is assigned to a motion vector of the feature point. In such a case, since the feature point FP1 is situated on a rather complicated portion of the object boundary, a matching point of the feature point FP1 can be uniquely determined at a real matching point FP1'. On the other hand, the boundary configuration around the feature point FP2 is relatively simple so that a matching point of the feature point FP2 may be assigned to a point, e.g., FP2", FP2' or FP2''', on a similar boundary configuration. Accordingly, the motion vector for the feature point FP1 having a larger variance of gradients has more chance to reflect the real motion of the object than the feature point FP2 having a smaller variance.

Subsequently, the first selector 900 provides forth edge map data to a second selector 1000, the forth edge map data including position data of the selected pixels and a gradient magnitude corresponding to each of the selected maximum P pixels.

The second selector 1000 compares the gradient magnitudes in the forth edge map data provided from the first selector 900 and selects a pixel having a largest gradient magnitude thereby setting the pixel as a selected feature point. An output from the second selector 1000 is a position data of the selected feature point.

In accordance with the present invention, for each block which includes one or more pixels having non-zero valued gradient magnitudes, a pixel with the greatest magnitude is selected among pixels having largest variances in the block as a feature point of the block. As a result, each feature point is determined on a portion of the object boundaries having complicated configuration, which is conducive to the better estimation of motion vectors for the feature points.

Even though the preferred embodiments of the invention have been described with reference to the first processing blocks of (N+1)×(N+1) pixels having a grid point at the center thereof, it should be apparent to those skilled in the art that the first processing block can be made to have $N_1 \times N_2$ pixels as long as a set of first processing blocks constitute the video frame, $N_1$ and $N_2$ being positive integers.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus, for use in a video signal processor which adopts a feature point based motion compensation technique, for determining feature points, said feature points being pixels capable of representing motions of objects in a video frame, comprising:

means for providing directional gradients and a gradient magnitude for each pixel in the video frame;

means for normalizing the directional gradients by dividing the directional gradients with the gradient magnitude;

means for generating a first edge map having the gradient magnitude for each pixel based on the gradient magnitude for each pixel, wherein the first edge map includes a number of edge points, each having a gradient magnitude, and a multiplicity of non-edge points, each having a zero value;

means for generating a second edge map having the normalized directional gradients for each pixel;

means for generating a plurality of grid points;

means for dividing the first edge map into a plurality of first processing blocks of an identical size, wherein the blocks do not overlap each other and each of the first processing blocks includes (N+1)×(N+1) gradient magnitudes corresponding to the pixels therein and has a grid points at the center thereof, N being an even integer;

means for providing, for the pixels included in each of the first processing blocks, (N+1)×(N+1) number of second processing blocks, each having normalized directional gradients for (2M+1)×(2M+1) number of pixels from the second edge map, wherein each of the second processing blocks includes said each of the pixels included in the first processing block at center thereof, M being an odd integer;

means for obtaining a variance for each of the pixels included in each of the first processing blocks based on the provided normalized directional gradients for each of the second processing blocks; and means for determining a feature point for each of the first processing blocks based on the gradient magnitude and variance corresponding to each of the pixels therein.

2. The apparatus according to claim 1, wherein said determination means includes:

means for selecting maximum P pixels, for each of the first processing blocks, in the order of the variances thereof beginning from a largest one, P being a predetermined number larger than 1, such that if P or more pixels having non-zero valued gradient magnitudes are included in each of the first processing blocks, P pixels are selected in a descending order of their variances, if fewer than P number of pixels having non-zero valued gradient magnitudes exist, all of those pixels are selected, and if all the pixels in each of the first processing blocks have the zero-valued gradient magnitude, no pixel is selected; and means for determining a pixel having a largest gradient magnitude among the selected maximum pixels as the feature point for each of the blocks.

3. A method for use in a video signal processor which adopts a feature point based motion compensation technique, for determining feature points, said feature points being pixels capable of representing motions of objects in a video frame, comprising the steps of:

(a) providing directional gradients and a gradient magnitude for each pixel in the video frame;

(b) normalizing the directional gradients by dividing the directional gradients with the gradient magnitude;

(c) generating a first edge map having the gradient magnitude for each pixel based on the gradient magnitude for each pixel, wherein the first edge map includes a number of edge points, each having a gradient magnitude, and a multiplicity of non-edge points, each having a zero value;

(d) generating a second edge map having the normalized direction gradients for each pixel;

(e) generating a plurality of grid points;

(f) dividing the first edge map into a plurality of first processing blocks of an identical size, wherein the blocks do not overlap each other and each of the first processing blocks includes (N+1)×(N+1) gradient magnitudes corresponding to the pixels therein and has a grid points at the center thereof, N being an even integer;

(g) providing, for the pixels included in each of the first processing blocks, (N+1)×(N+1) number of second processing blocks, each having normalized directional gradients for (2M+1)×(2M+1) number of pixels from the second edge map, wherein each of the second processing blocks includes said each of the pixels included in the first processing block at center thereof, M being an odd integer;

(h) obtaining e variance for each of the pixels included in each of the first processing blocks based on the provided normalized directional gradients for each of the second processing blocks; and (i) determining e feature point for each of the first processing blocks based on the gradient magnitude and variance corresponding to each of the pixels therein.

4. The method in accordance with claim 3, wherein said step (h) includes the steps of:

(h1) selecting maximum P pixels, for each of the first processing blocks, in the order of the variances thereof beginning from a largest one, P being a predetermined number larger than 1, such that if P or more pixels having non-zero valued gradient magnitudes are included in each of the first processing blocks, P pixels are selected in a descending order of their variances, if fewer than P number of pixels having non-zero valued gradient magnitudes exist, all of those pixels are selected, and if all the pixels in each of the first processing blocks have the zero-valued gradient magnitude, no pixel is selected; and (h2) determining a pixel having a largest gradient magnitude among the selected maximum pixels as the feature point for each of the blocks.

\* \* \* \* \*